Figure 1:
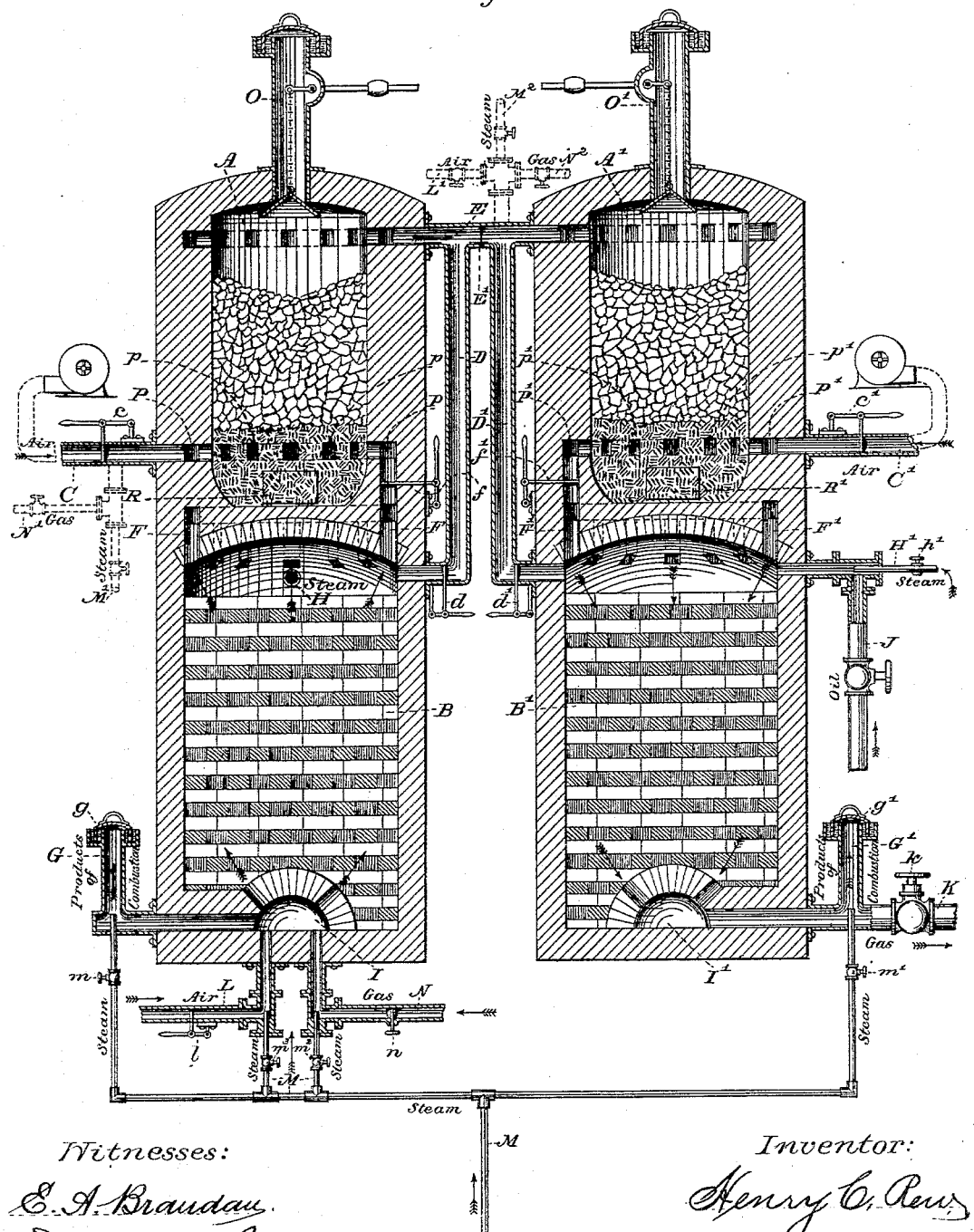

(No Model.) 2 Sheets—Sheet 1.

H. C. REW.
APPARATUS FOR MANUFACTURING GAS.

No. 389,103. Patented Sept. 4, 1888.

Witnesses:
E. A. Braudau
Alphonso Smith

Inventor:
Henry C. Rew (No Model.) 2 Sheets—Sheet 2.
H. C. REW.
APPARATUS FOR MANUFACTURING GAS.
No. 389,103. Patented Sept. 4, 1888.
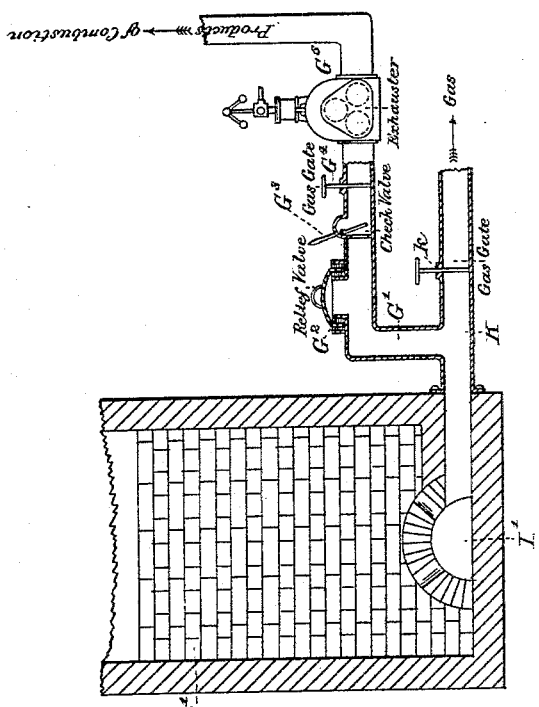
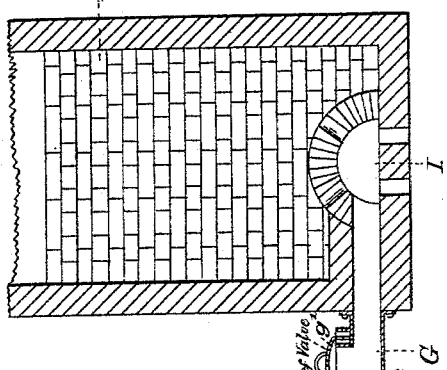
Witnesses:
E. A. Brandau
Alphonso B. Smith
Inventor:
Henry C. Rew

UNITED STATES PATENT OFFICE.

HENRY C. REW, OF CHICAGO, ILLINOIS.

APPARATUS FOR MANUFACTURING GAS.

SPECIFICATION forming part of Letters Patent No. 389,103, dated September 4, 1888.

Application filed July 22, 1886. Serial No. 208,716. (No model.)

*To all whom it may concern:*

Be it known that I, HENRY C. REW, of Chicago, in the county of Cook and State of Illinois, have invented certain new and useful Improvements in Apparatus for Manufacturing Gas; and I do hereby declare that the following is a full, clear, and exact description of the same, which will enable others skilled in the art to which it appertains to make and use the same, reference being had to the accompanying drawings, and to the letters of reference marked thereon, which form a part of this specification.

This invention relates to the manufacturing of gas, and is an improvement on an apparatus and the processes connected therewith which was patented to me May 11, 1886, by Patent No. 341,506.

In the practical building and operating of furnaces of the character described in the above-mentioned patent I have discovered that further improvements were desirable and necessary for the successful and economical manufacture of gas. I have found, in burning gases in the lower chambers, that the rapid accumulation of heat in the refractory material and the strong tendency of heat to rise (of which my apparatus is constructed to take the greatest possible advantage) prevented the free flow of the hot products of combustion downwardly through the brick-work, and that the presence of the incombustible gases under pressure in the combustion-chamber checked and hindered the combustion necessary to heat the brick-work. To overcome these difficulties I have found that exhausters of some sort were positively required to draw out the waste products of combustion from the bottom of the regenerative chambers.

Having stated the nature and object of my invention, I will now proceed to describe them more particularly with reference to the accompanying drawings, which form a part of this specification, in which—

Figure 1 represents a vertical section of my improved apparatus, showing the waste products of combustion exhausted from the regenerative chambers by increasing the height of the outlets thereof and using steam-pipes as injectors therein. Fig. 2 represents the outlets for waste gases as being connected with either a lofty smoke-stack or chimney or supplied with a mechanical exhauster for exhausting or drawing out the spent products of combustion from the bottom of the regenerative chambers, also showing the outlets for waste gases as being supplied with relief-valves to provide for any sudden expansion of gases in the generators, and also with check-valves to automatically control the strong tendency of heat to rise and escape from the apparatus and to prevent the inrush of cold air and gases into the bottom of the apparatus.

Similar letters of reference designate like parts, as shown in Patent No. 341,506, to which reference has been previously made.

Two cupolas are used, as before, having the combustion-chambers A A' located in the upper part of each cupola and the superheating-chamber B and the gas-fixing chamber B' located below the combustion-chambers, as shown. Brick-work arches separate the fuel-chambers A A' from chambers B B'. The cupolas are connected by the flue E in the upper part of the combustion-chambers, and flues D D', provided with valves $d$ $d'$, lead from flue E to the tops of chambers B B', for conducting products of combustion from the tops of fuel-chambers A A' to the tops of the superheating and fixing chambers B B'. Flues F F', having valves $f f'$, connect the annular flues P P', surrounding the fuel-chambers at their base, with the tops of chambers B B'. Air-supply pipes C C', having valves $c$ $c'$, connect with annular flues P P', having tuyeres or ports $p p'$, leading into the bases of the fuel-chambers A A'. Perforated brick arches for supporting the loose brick-work are located at the bases of chambers B B', forming chambers I I'. Outlet-pipes G G' G⁶, for products of combustion, controlled by safety or relief valves $g$ $g'$ $G^2$, and having check-valves $g^2$ $G^3$ and gas-gates $g^3$ $G^4$ and exhauster $G^5$, extend from chambers I I' and pipe K, controlled by valve $k$ for the gas-outlet extending from pipe G'.

In Fig. 1 steam-jet pipes and in Fig. 2 a blower and also a chimney are shown in connection with outlets for the products of combustion and for the purpose of exhausting such products from the apparatus. The steam-jet pipes are preferred for this purpose.

Supply-pipes L, M, and N, (having controlling-valves,) respectively for air, steam, and gas, connect with chamber I of superheating-chamber B, and pipes M' N', for steam and gas, respectively, may also connect with the base of fuel-chamber A. Air-pipe L', steam-pipe $M^2$, and gas-pipe $N^2$, as indicated in dotted lines, may connect with the flue E, connecting the two cupolas. They thus communicate through said flue E with each of the fuel-chambers at its upper part immediately beneath the feeding apparatus. The flue E may be closed by valve E' when it is desired to manufacture gas in limited quantity in only one cupola.

The apparatus may be operated in several different ways, as follows: For instance, if it is desired to manufacture gas in large quantities, both of the combustion-chambers A A' may be charged with any suitable carbonaceous material and ignited, and the valves $d\,d'$ in the flues D D' and the valves in the outlet-flues for waste products of combustion opened. The fires are simultaneously supplied with air-blasts admitted through the pipes C C', controlled by valves $c\,c'$. P and P' represent annular flues running entirely around each combustion-chamber A A', which are connected with the combustion-chambers by the tuyere holes or ports $p\,p'$. The air is driven by any suitable means—such as a blowing-engine (indicated in the drawings)—through the annular flues and tuyere-holes, and enters the fuel from every side. The products of combustion and gas generated are drawn upward through the fuel and then downward through the flues E D D' into the upper part of the superheating and fixing chambers B B' by any one or all of the exhausters previously put in operation. Air from the annular flues, free from dust and ashes, is also admitted with the hot gases into those chambers through the flues F F'. These flues are controlled by valves $f\,f'$, which can be operated to permit a portion of the air introduced through C' to pass down among the products or gases in the chamber below. This causes them to burn, and the final hot products are drawn by the exhausters down through the chambers B B', highly heating the loose brick-work contained therein. When properly heated, the air-supply is shut off and the valves $d\,d'$ in the pipes D D' are closed. Steam is then admitted at the tops of chambers B B' through pipes H H', or into the flue E, which connects the two cupolas through pipe $M^2$, which drives out the products of combustion remaining in the apparatus. The exhausters are then stopped, the valves for the outlets of the products of combustion are closed, the gas-outlet valve $k$ in the pipe K is opened, and the apparatus is then ready to manufacture and fix gas. Steam, air, or gas, or any mixture of the same, is then admitted at the bottom of the superheating-chamber B through pipes L, M, and N, and the mixed gases are passed up through the brick-work, where they are heated to their decomposing temperature and partially decomposed into carbonic-acid and hydrogen gases, provided that steam and gas are used. From the upper part of chamber B—being, until the heat is exhausted, the hottest part of the chamber—the mixed gases pass up through flue F and through the annular flue P and ports $p$ into the combustion-chamber, where further decomposition and recomposition of the gases take place in contact with the incandescent carbonaceous material. The gases are then drawn by the exhausters through the flue E into the adjoining combustion-chamber A' and down through the incandescent fuel, where the operation of thoroughly decomposing the mixed gases is completed. The gases then pass down through the connecting-flues into the fixing-chamber B' and down through the heated refractory material, becoming thereby fixed into a homogeneous gas, then out through the pipe K to the main. A test-burner is connected with the pipe K, and, in case the gas needs enriching, oil or oil-vapors may be injected in the upper part of the fixing-chamber B' through pipe J, which will be combined and fixed with the gases in their passage through the fixing-chamber, and a fixed gas of any desired candle-power can thus be manufactured. Air or a non-illuminating gas or steam may be used separately and admitted to the bottom of chamber B through pipes L, M, or N, and thus utilized as a medium for the manufacture of gas, according to the material used in the combustion-chambers A A' and the quality of gases that it is desired to manufacture.

In case it is desired to manufacture gas in more limited quantities, the single combustion-chamber A alone may be charged with fuel, ignited, and supplied with air to cause combustion, and the products of combustion may be burned in the adjoining chamber A' by admitting air through pipe C', the annular flue P', and the tuyere holes or ports $p'$, and the hot resulting gases may be drawn down, as before, through the fixing-chamber B' to heat the brick-work. Steam, air, or gas, or any mixture of the same, may then be drawn into the bottom of chamber A by the exhausters and decomposed, and, as before, enriched and fixed by being drawn down through the fixing-chamber B'; or the flue E may be closed by a valve centrally located on the dotted line E', so as to cut off the superheating-chamber B, the combustion-chamber A, and the flue D connecting the same. The combustion-chamber A' may then be charged with fuel and ignited, supplied with air to cause combustion through the pipe C', annular flue P', and tuyeres or ports $p'$ and the products of combustion burned in the fixing-chamber B', as in the first instance, by admitting air free from dust and ashes through flues F' F'. Then, after closing the valve $d'$ in the flue D', steam, air, or gas, or any mixture of the same, may be admitted through pipes L', $M^2$, or $N^2$ into the flue E, and thus into the top of the combustion-chamber A', and drawn by the exhausters down through the incandescent fuel in the chamber A' and into the fixing-chamber B', and enriched by admitting oil or oil-vapors, and fixed by passing down through the heated brick-work in the fixing-chamber B'.

The apparatus may also be readily modified to manufacture gas from steam, gas, or liquid hydrocarbons, as shown in patent granted to me April 6, 1886, No. 339,472.

The ashes resulting from the complete decomposition of the carbonaceous material are crowded down into the ash-pits below the ports or tuyere-holes by the weight of the material working down through the generating-chambers, and are removed periodically through doors R R'.

Great advantages are gained by supplying the generating-chambers with fuel through the tight feeding apparatus O O', as compared with gas-generating apparatus that open the tops of the chambers to admit carbonaceous material, for the reason that the gas and heat are confined in the apparatus, and the large loss of heat and gas caused by fully opening the generating-chambers to supply fresh fuel is thus entirely avoided. Each of these devices includes a tightly-closed cover, preferably sealed, and a valve, which latter is in practice tightly closed when the former is removed for the introduction of fuel, and the upper cover is applied before opening the valve to allow the charge of fuel to fall into the chambers below. This feeding apparatus, adapted to be tightly closed, is not my invention, but it has special relation to the arrangement of air, steam, or gas pipes leading through flue E into the upper part of the fuel-chamber. These pipes are intended to introduce fluids under pressure, and it is peculiarly important in my process that means be adopted for preventing the upward escape of the same and for directing them all downwardly and against their natural tendency to rise because of their small specific gravity. It is only to the special combination set forth that claim is now made.

I do not herein claim a combination arranged to exhaust combustible gases into the sole holder or receptacle of a gas-making apparatus, nor a combination which in operation utilizes the heat of the products of combustion between the fuel-chamber and regenerator.

I am aware that an apparatus which admitted air below the fuel and also into the top of a regenerator without means for forcing the entry thereof, and in which the products were exhausted by the aid of a chimney having no valve or damper at its base or near the regenerator, steam being admitted near the top of such chimney and conducted down to the base of the regenerator during the gas-making operation, has been heretofore proposed. It is characteristic of my present improvement that air is blown both into the fuel to overcome the friction thereof and into the regenerator to aid in overcoming the friction of the brick-work, and that means for exhausting the burned gases are connected directly with the outlet from the regenerator. Power is thus distributed and applied at different points in a manner favorable to an equable and uniform movement of air and gases through the apparatus. In previous apparatus of the same general character as the present—such as set forth in patent to Strong, No. 197,062—air has been drawn into the fuel through the ash-pit door and admitted between the fuel and regenerator through a valved open-ended tube, and a chimney and steam-jet relied upon both to draw in the air and expel the gases. The action of such a combination is not sufficiently equable and certain to produce good results. The application of power, whether by an exhaust or blast, at one point to move the air and gases is objectionable for several reasons, among which is the generation of a tense current in one part of the apparatus in order to produce a sufficient effect in a remote part. Such conditions within the apparatus are not favorable to the production of the chemical and other changes desired. The above patented apparatus is also defective, because in the gas-making operation it necessitates the introduction of steam into the upper part of a chimney, the top of which must be closed by a valve. This chimney necessarily loses heat very rapidly, being of comparatively small diameter and exposed to the air on all sides. It therefore is soon cooled, and it in turn cools and partially condenses the steam passing down its interior. One feature of the present improvement relates to the location of a valve near the outlet for products from the regenerator and the location of the steam-supply pipe in or near said outlet, whereby steam is introduced more directly into the superheating-generator. Another defect of the said patented apparatus consists in the use of a simple brick wall between the regenerator and fuel-chamber. Such a wall is not capable of preventing steam from passing directly through it from the regenerator to the fuel and without ascending through the open brick-work of the regenerator.

Heretofore air has been blown into the apparatus with a sufficient force to drive gases through the same, and this air-blast has been supplemented with an air-supply between the fuel and the brick-work, and it has been supposed that this arrangement would produce the best results because of the pressure produced in the brick-work, whereby it was thought that the heat of the products would be better imparted to the same; but I have discovered that when it is attempted to thus force gases through the regenerator the carbonic acid is not removed with sufficient speed or certainty to allow perfect combustion to take place in the regenerator. The partially-burned gases and the fresh air become mingled with a certain amount of carbonic acid and interfere with the proper union of the air and unburned gases and with the perfect combustion of the latter, and they will not finally burn until they are discharged from the regenerator. I remedy the evil by withdrawing the carbonic acid produced in the regenerator by an exhaust which removes it as soon as produced and prevents its interfering with combustion in the regenerator, as when the unburned gases and fresh air are forced forward by a blast.

It is generally supposed that the use of a powerful blast creates a desirable pressure in the regenerator, and that such pressure is highly favorable to the heating of the brickwork; but I have discovered that such pressure prevents perfect combustion, and, as I believe, by preventing a prompt removal of incombustible gases and a proper union of the supplemental air-supply with the unburned gases coming from the generator. By the use of an exhaust in connection with the introduction of fresh air to complete the combustion of unburned gases leaving the generator, I remove the incombustible gases and diminish pressure in the regenerator, so that the air and combustible gases are thoroughly mingled and the latter completely burned in said regenerator—a result not before attained. The use of the exhaust also enables the fires to be cleaned and ashes removed without suspending gas-making, as is now generally practiced where a supplemental air-supply between the generator and regenerator is employed.

It will be understood that the particular direction in which the products are exhausted through the regenerator is not of the essence of my present invention, but that it is mainly important that the non-combustible gases be withdrawn by an exhaust in such manner as to prevent their interference with combustion in said regenerator.

Having thus described the apparatus, what I claim as my invention, and desire to secure by Letters Patent, is as follows:

1. In apparatus for manufacturing gas, the combination of a combustion-chamber, a blower or like means for supplying an air-blast to the fuel in the same, and also for supplying air to burn the products of combustion, a brick-work regenerative chamber, a flue connecting the combustion and regenerative chambers, an outlet from the regenerator having free communication with the open air, a valve for said outlet adjacent to the regenerator, and an exhaust-steam pipe or equivalent connected with the outlet, substantially as specified, whereby fuel may be supplied with an air-blast and the partially-burned products passed into the regenerator and therein supplied with an air-blast and thoroughly burned, and the final products drawn through the brick-work and freely discharged, and the various desired movements of air and products of combustion produced with certainty and efficiency.

2. In apparatus for manufacturing water-gas, the combination of a combustion-chamber, a blower or like means for supplying an air-blast to the base of the fuel in the same, and also for supplying air to burn the products of combustion, a brick-work regenerative chamber, a flue connecting the combustion and regenerative chambers, an outlet from the regenerator having free communication with the open air and located below said flue connecting the combustion and regenerative chambers, a valve for said outlet adjacent to the regenerator, and an exhaust-steam pipe or equivalent connected with the outlet, substantially as specified, whereby fuel may be supplied with an air-blast and the partially-burned products passed into the regenerator and therein supplied with an air-blast and thoroughly burned, and the final products drawn downwardly through the brick-work and freely discharged, and the various desired movements of air and products of combustion produced with certainty and efficiency.

In testimony that I claim the foregoing as my own I hereby affix my signature in the presence of two witnesses.

HENRY C. REW.

Witnesses:
E. A. BRANDAN,
A. B. SMITH.